(12) United States Patent
Keller et al.

(10) Patent No.: US 10,013,473 B2
(45) Date of Patent: *Jul. 3, 2018

(54) FAST SNAPSHOTS

(71) Applicant: INTERNATIONAL BUSINESS MACHINES CORPORATION, Armonk, NY (US)

(72) Inventors: Michael Keller, Haifa (IL); Orit Nissan-Messing, Hod HaSharon (IL); Dani Shemesh, Ramat Gan (IL); Eliyahu Weissbrem, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/848,506

(22) Filed: Sep. 9, 2015

(65) Prior Publication Data

US 2015/0379106 A1 Dec. 31, 2015

Related U.S. Application Data

(63) Continuation of application No. 13/778,506, filed on Feb. 27, 2013, now Pat. No. 9,189,490, which is a continuation of application No. 13/221,000, filed on Aug. 30, 2011, now Pat. No. 9,201,892.

(51) Int. Cl.
| | |
|---|---|
| *G06F 17/30* | (2006.01) |
| *G06F 12/16* | (2006.01) |
| *G06F 3/06* | (2006.01) |
| *G06F 11/14* | (2006.01) |
| *H04L 12/26* | (2006.01) |
| *G06F 17/00* | (2006.01) |

(52) U.S. Cl.
CPC ........ *G06F 17/30578* (2013.01); *G06F 3/065* (2013.01); *G06F 3/0608* (2013.01); *G06F 3/0653* (2013.01); *G06F 3/0689* (2013.01); *G06F 11/1446* (2013.01); *G06F 11/1469* (2013.01); *G06F 12/16* (2013.01); *G06F 17/30174* (2013.01); *G06F 17/30876* (2013.01); *H04L 43/10* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | |
|---|---|---|
| 7,720,801 B2 | 5/2010 | Chen |
| 7,779,295 B1 | 8/2010 | Shah et al. |
| 8,250,035 B1 | 8/2012 | Tang et al. |

(Continued)

OTHER PUBLICATIONS

Levanoni et al. "An On-the-Fly Reference Counting Garbage Collector for Java", ACM 2001.*

(Continued)

*Primary Examiner* — Polina G Peach
(74) *Attorney, Agent, or Firm* — Griffiths & Seaton PLLC

(57) ABSTRACT

A fast snapshot is configured to determine if a snapshot is utilized for asynchronous mirroring. The fast snapshot operation is performed by avoiding reference counts of the one or more data units associated with the snapshot from being updated at a creation time and a deletion time when the snapshot is utilized for asynchronous mirroring.

21 Claims, 7 Drawing Sheets

(56) References Cited

U.S. PATENT DOCUMENTS

| | | |
|---|---|---|
| 8,286,030 B1 | 10/2012 | Chatterjee et al. |
| 8,332,354 B1 | 12/2012 | Chatterjee et al. |
| 8,341,115 B1 | 12/2012 | Natanzon et al. |
| 8,352,431 B1* | 1/2013 | Protopopov ...... G06F 17/30082 707/640 |
| 8,578,128 B1 | 11/2013 | Davenport et al. |
| 8,650,145 B2 | 2/2014 | Navarro et al. |
| 2003/0182325 A1* | 9/2003 | Manley ............... G06F 11/2066 |
| 2005/0015663 A1* | 1/2005 | Armangau ........... G06F 11/2074 714/15 |
| 2005/0027748 A1* | 2/2005 | Kisley ................. G06F 11/2074 |
| 2006/0036655 A1 | 2/2006 | Lastovica, Jr. |
| 2007/0011361 A1* | 1/2007 | Okada .................. G06F 3/0619 710/8 |
| 2007/0033356 A1* | 2/2007 | Erlikhman .......... G06F 11/1456 711/162 |
| 2007/0050416 A1 | 3/2007 | Battagin et al. |
| 2007/0073972 A1 | 3/2007 | Zohar et al. |
| 2007/0220322 A1* | 9/2007 | Mikami ................ G06F 11/324 714/13 |
| 2008/0168218 A1* | 7/2008 | Arakawa ............ G06F 11/1456 711/112 |
| 2009/0112811 A1 | 4/2009 | Oliveira et al. |
| 2010/0057789 A1* | 3/2010 | Kawaguchi ......... G06F 11/1456 707/E17.005 |
| 2010/0077142 A1 | 3/2010 | Fienblit et al. |
| 2010/0241614 A1* | 9/2010 | Shaull ............... G06F 17/30339 707/649 |
| 2011/0161381 A1* | 6/2011 | Wang ................ G06F 17/30088 707/814 |
| 2011/0225382 A1 | 9/2011 | Malkin et al. |
| 2011/0238936 A1 | 9/2011 | Hayden |
| 2011/0282843 A1* | 11/2011 | Wang .................. G06F 11/1466 707/649 |
| 2012/0243395 A1 | 9/2012 | Farey |
| 2012/0303581 A1 | 11/2012 | Calder et al. |
| 2012/0317353 A1* | 12/2012 | Webman ................ G06F 3/065 711/108 |
| 2013/0007366 A1 | 1/2013 | Garmiza et al. |
| 2013/0013564 A1 | 1/2013 | Ben-Or et al. |
| 2013/0036091 A1 | 2/2013 | Provenzano et al. |

OTHER PUBLICATIONS

Levanoni et al. "An On-the-Fly Reference Counting Garbage Collector for Java", ACM 2006.*

Darrin Chapman, Mike Federwisch, Chuck Dufresne "SnapMirror® Best Practices Guide", Network Appliance, Inc (Year: 2006).*

Paz et al., "An Efficient On-the-Fly Cycle Collection", 43 pages, vol. 29, No. 4, ACM Transactions on Programming Languages.

"Working with Oracle Solaris ZFS Snapshots," an Oracle White Paper, Apr. 2010 (9 pages).

Peterson et al., "Ext3cow: The Design, Implementation, and Analysis of Metadata for a Time-Shifting File System," Technical Report HSSL-2003-03, Hopkins Storage Systems Lab, Dept. of Computer Science, John Hopkins University 2003 (14 pages).

* cited by examiner

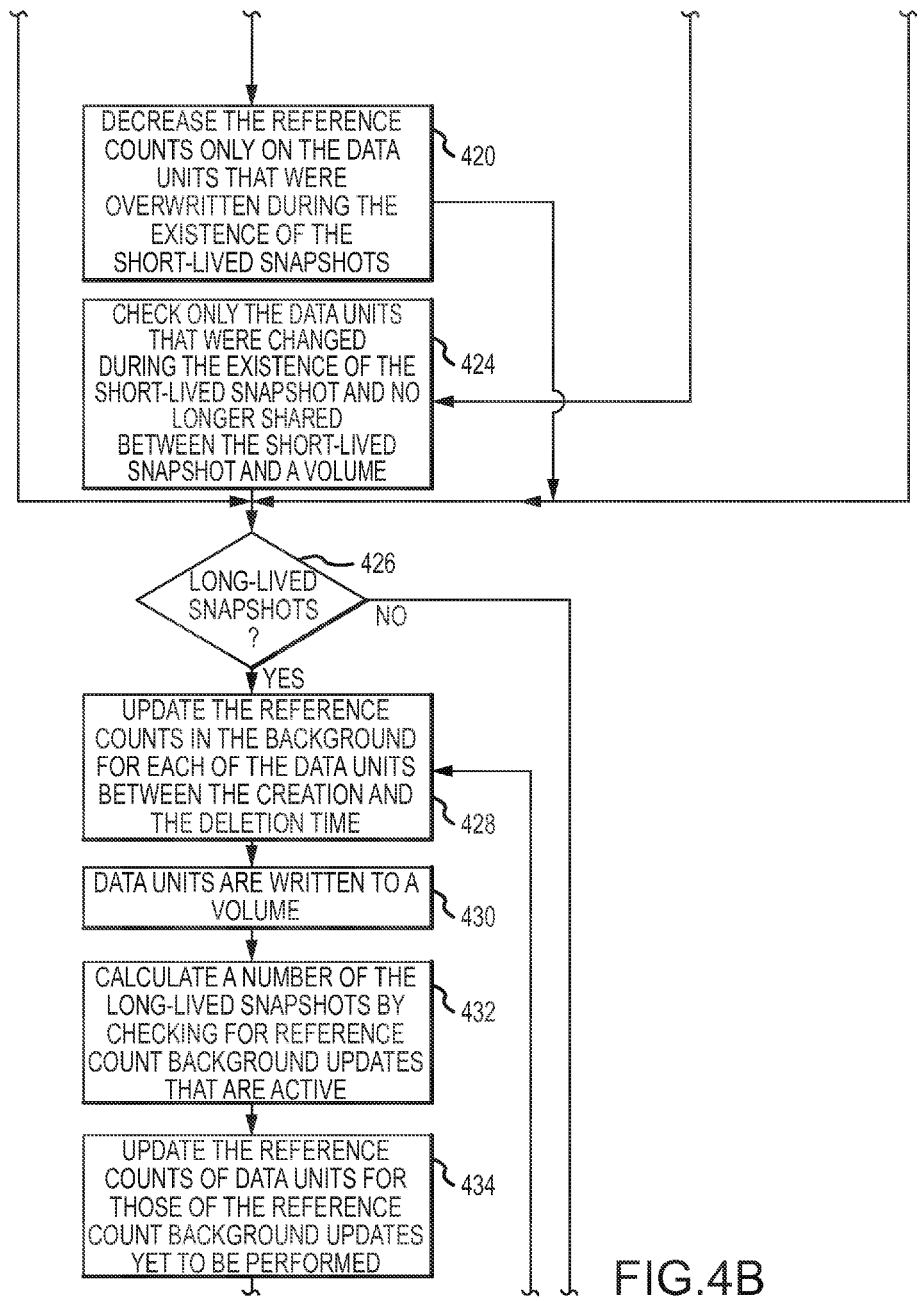

FAST SNAPSHOTS

CROSS REFERENCE TO RELATED APPLICATIONS

This Application is a Continuation of U.S. patent application Ser. No. 13/778,506, filed on Feb. 24, 2013, which is a Continuation of U.S. patent application Ser. No. 13/221,000, filed on Aug. 30, 2011, both of which are incorporated herein by reference.

BACKGROUND OF THE INVENTION

Field of the Invention

The present invention relates generally to computers, and more particularly, to performing a snapshot operation in a computing environment.

Description of the Related Art

In today's society, computer systems are commonplace. Computer systems may be found in the workplace, at home, or at school. Computer systems may include data storage systems, or disk storage systems, to process and store data.

SUMMARY OF THE DESCRIBED EMBODIMENTS

In a data processing system or computing environment, a snapshot, storing the state of such system at a particular point in time, may be taken. Typically, a snapshot points to the data units of the snapshot's master volume, for all unchanged data units, in order to save disk space. However, a need exists for increasing the efficiency and productivity of snapshot operations, such as snapshot creation and deletion operations, when factors such as determining whether a data unit is used by other snapshots or volumes in order to free unused data units are taken into consideration.

Accordingly, and in view of the foregoing, various method, system, and computer program product embodiments for performing a snapshot for monitoring usage of one or more data units are provided. In one embodiment, by way of example only, a fast snapshot is configured to determine if a snapshot is utilized for asynchronous mirroring. The fast snapshot operation is performed by avoiding reference counts of the one or more data units associated with the snapshot from being updated at a creation time and a deletion time when the snapshot is utilized for asynchronous mirroring.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 4A-4C is a flowchart illustrating an exemplary method for a snapshot operation for faster snapshots.

DETAILED DESCRIPTION OF CERTAIN EMBODIMENTS

Figure 1:
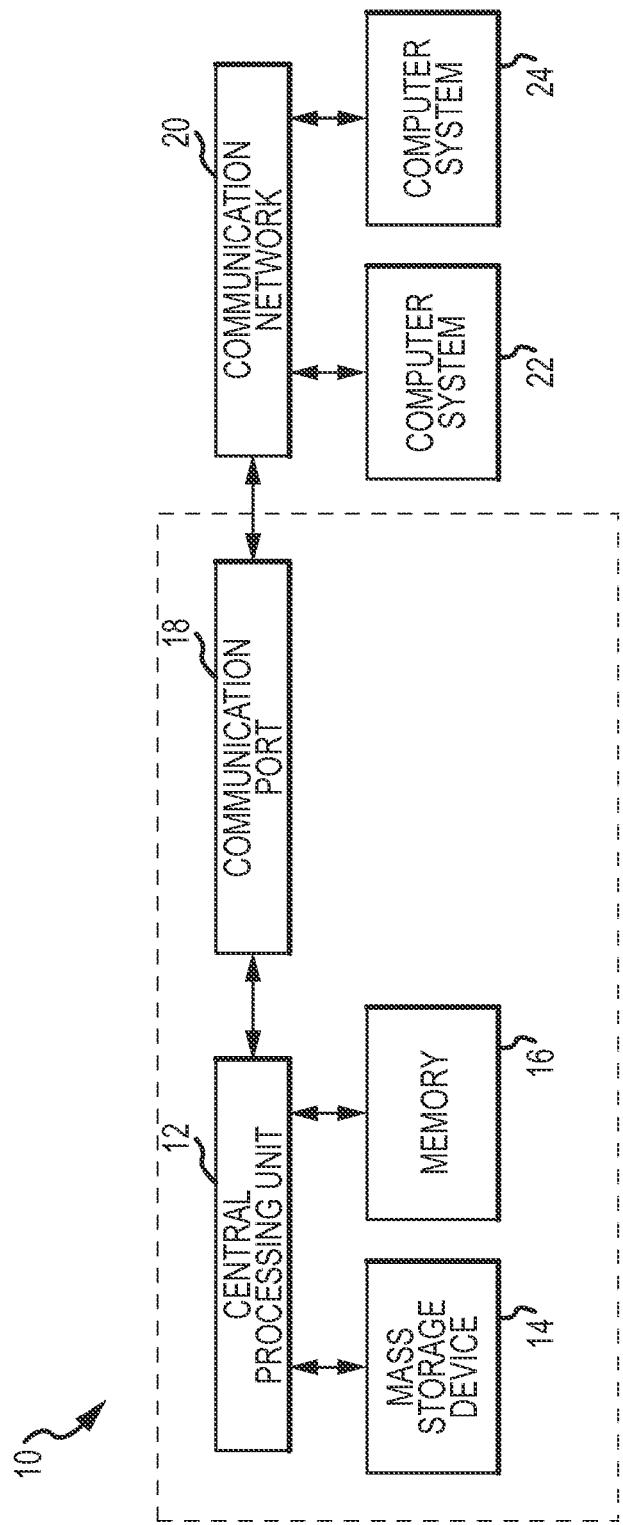
FIG. 1 illustrates a computing environment having an example storage device in which aspects of the present invention may be realized.

As mentioned previously, in a data processing system or computing environment, a snapshot may be taken in various circumstances to save a history of the system at a particular point in time. Again, as previously mentioned, a snapshot points to the data units of the snapshot's master volume, for all unchanged data units, in order to save disk space. For any snapshot operation, a mechanism to determine whether a data unit is used by other snapshots or volumes in order to free unused data units is needed. Two techniques for monitoring data unit usage that are considered to address this issue are bitmaps or reference counts of each unit of data. The use of bitmaps, however, may require a large amount of memory; specifically it is linear both in the number of snapshots and the volume size. Hence it may not scale well. Alternatively, reference counting refers to storing the number of references, pointers, or handles to a resource such as an object, block of memory, disk space or other resource. Reference counts are linear to the amount of used units of data and not depended on the number of snapshots. Reference counts may incur a high up-front cost when creating or deleting a snapshot. For example, a master volume may consist of blocks A, B, and C. When creating a snapshot, reference counts of each of these blocks are raised to 2 (indicating that they are used by both master volume and snapshot). Now assume, a host writes to A. The system will make a copy A' for use by the master volume, and modify only A' with the host write. A' will have a reference count of 1 (for the master volume), and A will have a reference count of 1 (for the snapshot). Should a host now delete the snapshot, then the reference counts of A, B, C are decreased by 1 each. Hence, block A's reference count will drop to 0, which means, the block may be freed.

Mechanisms of the illustrated embodiments serve to increase efficiency and production of snapshot operations, such as snapshot creation and deletion, but performing what will be termed herein as "fast snapshots." In one embodiment, these fast snapshots are created as regular reference counted snapshots but the reference count update process is not performed at the creation and/or deletion time. Rather, the mechanisms of the illustrated embodiments distinguish between short-lived and long-lived system snapshots in order to save space and gain performance during data snapshot use for read/write operations. Only short-lived snapshots are "fast snapshots"; long-lived snapshots are regular reference-counted snapshots, where the reference count is updated at creation/deletion. Fast snapshots essentially forgo the upfront cost, at the expense of slightly more expensive checks for whether a storage block is used. But since fast snapshots are short-lived, they are in most cases almost identical to the master volume (very few changed blocks), and therefore, there is a very short list of modified blocks.

If the snapshot is known to be short-lived, such as a snapshot used in asynchronous mirroring with low recovery point objective (RPO), then the reference counts will not be updated. Asynchronous mirroring is maintaining a backup copy of a volume on a physically separate storage system;

updates to the source system are propagated asynchronously (that is, the host receives a "success" on a write, before the data is actually replicated to the target system). RPO reflects the time that the target system's volume lags behind the source system's volume. Alternatively, if the snapshot is expected to be a long-lived snapshot, the reference count will be updated in the background after the snapshot is created (the background may refer to processes that are taking place that utilize system resources during periods when system resources or not being used as often, processes that are taking place without the system resources being aware of the updates, and/or other processes that are less conspicuous, for example).

In one embodiment, snapshots created for the sake of asynchronous mirroring (with low RPO) are expected to be short-lived, while any other snapshots are expected to be long-lived. The motivation is that in short-lived snapshots, only a few data units will be updated until the time of the snapshot deletion. As such, the cost savings for updating the reference count of all the data units is distributed over time. The cost savings is also distributed over time for updating the reference count for long-lived snapshots. Thus, the fast snapshots, performed according to the mechanisms of the following illustrated embodiments, avoid the high up front cost of the reference count model while keeping a low memory cost advantage.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The backup operations further described may be executed on device(s) 14, located in system 10 or elsewhere. Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
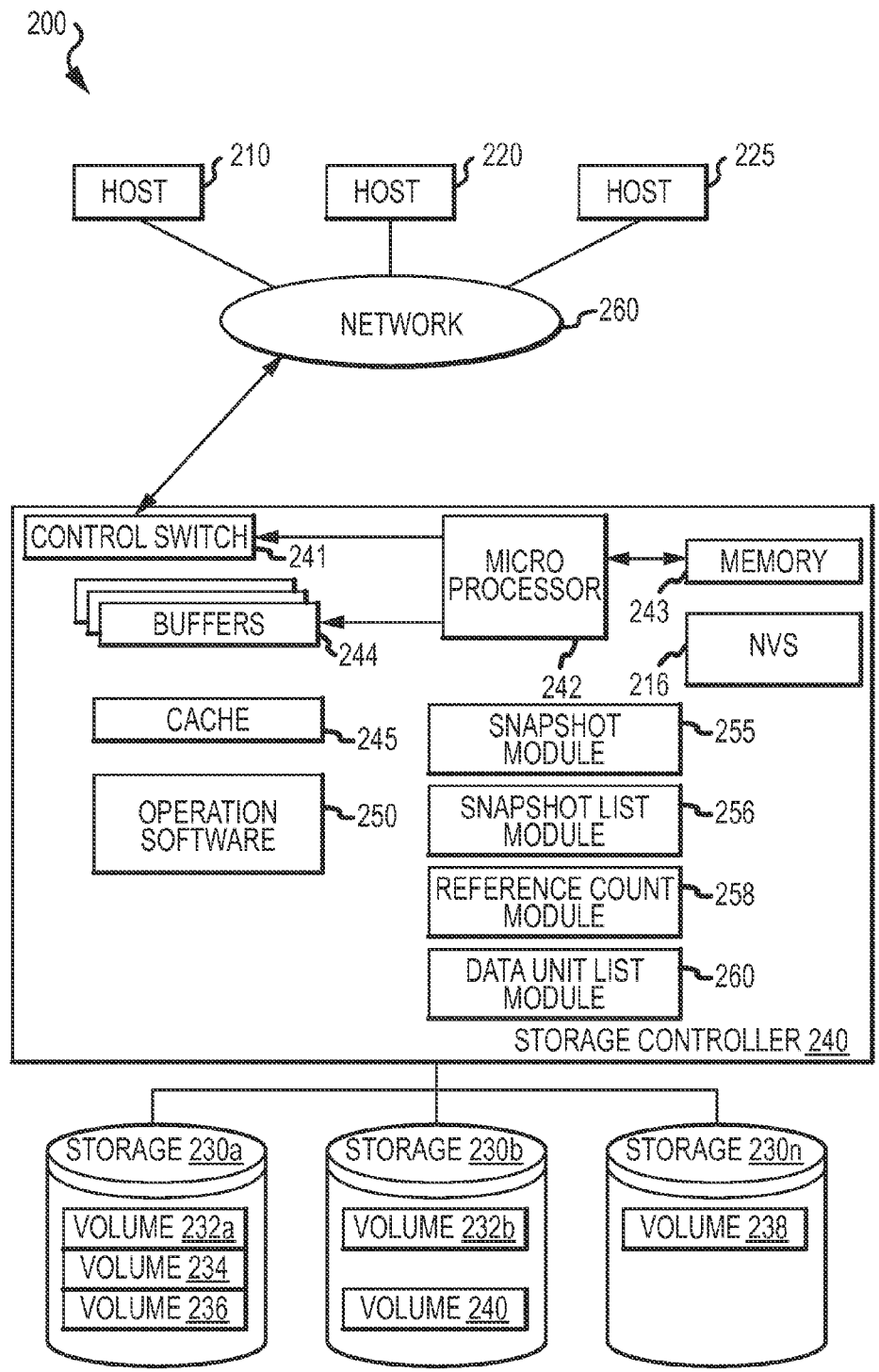
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data which the processor 242 may access for executing functions and method steps associated with managing storage 230 and executing the steps and methods of the present invention for snapshot operation in a computer storage environment. In one embodiment, system memory 243 includes, is associated, or is in communication with the operation software 250 for performing the discard scans in a computer storage environment, including the methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a snapshot module 255, snapshot list module 256, reference count module 258, and data unit list module 260 to assist with performing snapshot operations. The snapshot module 255, snapshot list module 256, reference count module 258, and data unit list module 260 may work in conjunction with each and every component of the storage controller 240, the hosts 210, 220, 225, and storage devices 230. Both the snapshot module 255, snapshot list module 256, reference count module 258, and data unit list module 260 may be structurally one complete module in a computer storage environment or may be associated and/or included with other individual modules illustrated in the computer storage environment. The snapshot module 255, snapshot list module 256, reference count module 258, and data unit list module 260 may also be located in the cache 245 or other components of the storage controller 240 to accomplish the purposes of the present invention.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and snapshot module 255, snapshot list module 256, reference count module 258, and data unit list module 260 in which information may be set. Multiple buffers 244 may be implemented with the present invention to assist with the snapshot operation as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, snapshot module 255, snapshot list module 256, reference count module 258, and data unit list module 260 are in communication with each other and may be separate or one individual component(s). Also, several, if not all of the components, such as the operation software 245 may be included with the memory 243 for performing the snapshot operation. Each of the components within the devices shown may be linked together and may be in communication with each other for purposes suited to the present invention.

Figure 3:
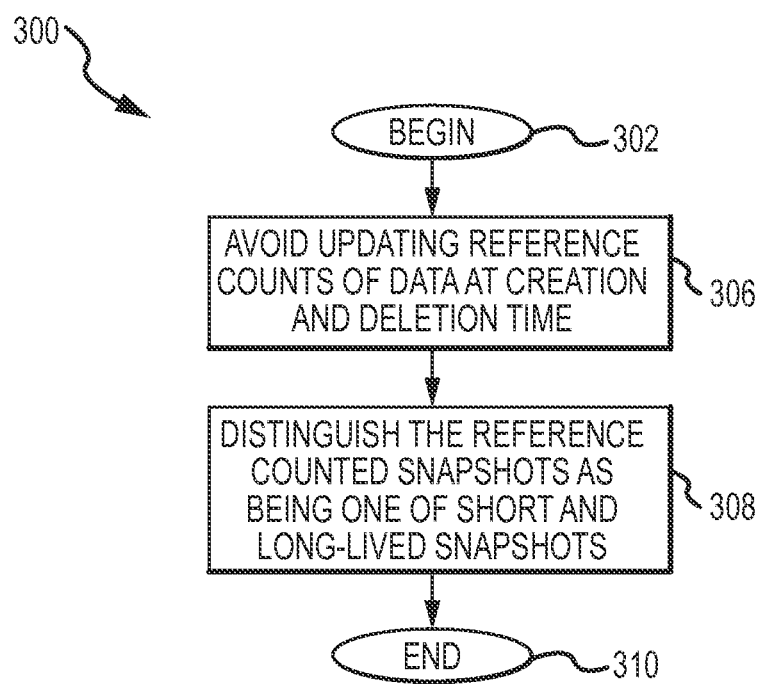
FIG. 3 is a flowchart illustrating an exemplary method for performing a snapshot operation.

FIG. 3 is a flowchart illustrating an exemplary method 300 for performing a fast snapshot operation in an exemplary embodiment. Method 300 may be adapted to be performed by software or hardware associated with a computing environment as previously described in FIGS. 1 and/or 2, or another mechanism. In addition, method 300 may be embodied as a computer program product to be executed by a processor or other hardware device. The method 300 begins (step 302). Reference counts of data units are avoided from being updated at a creation and a deletion time (step 304). In other words, at the time the reference counted snapshot is either created or deleted in the computing environment, the reference count associated with the snapshot is not updated. In conjunction with step 304, the method 300 may distinguish the reference counted snapshots as being one of short and long-lived snapshots (step 306). The method 300 ends (step 308).

Figure 4A:
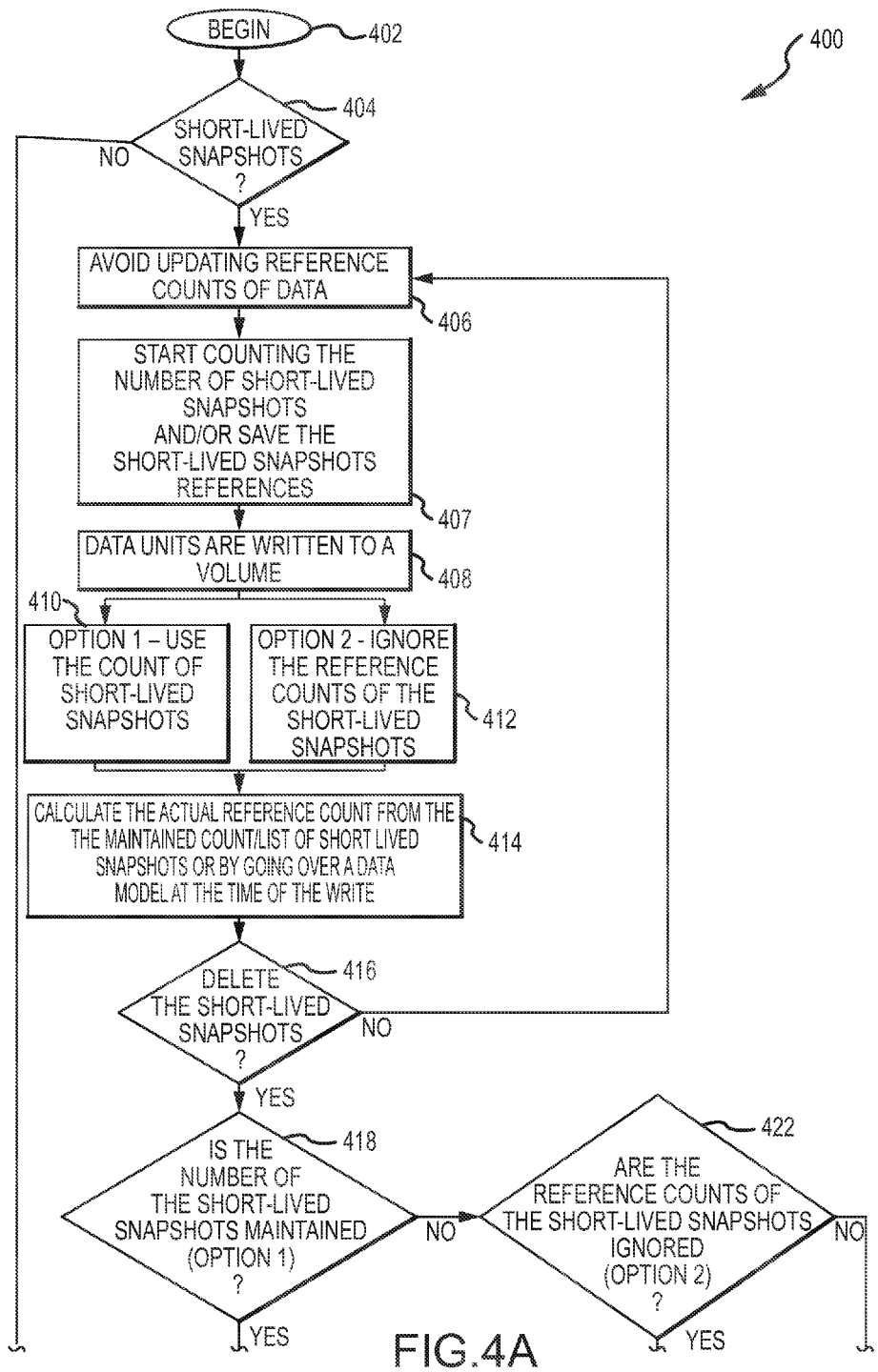
Figure 4C:
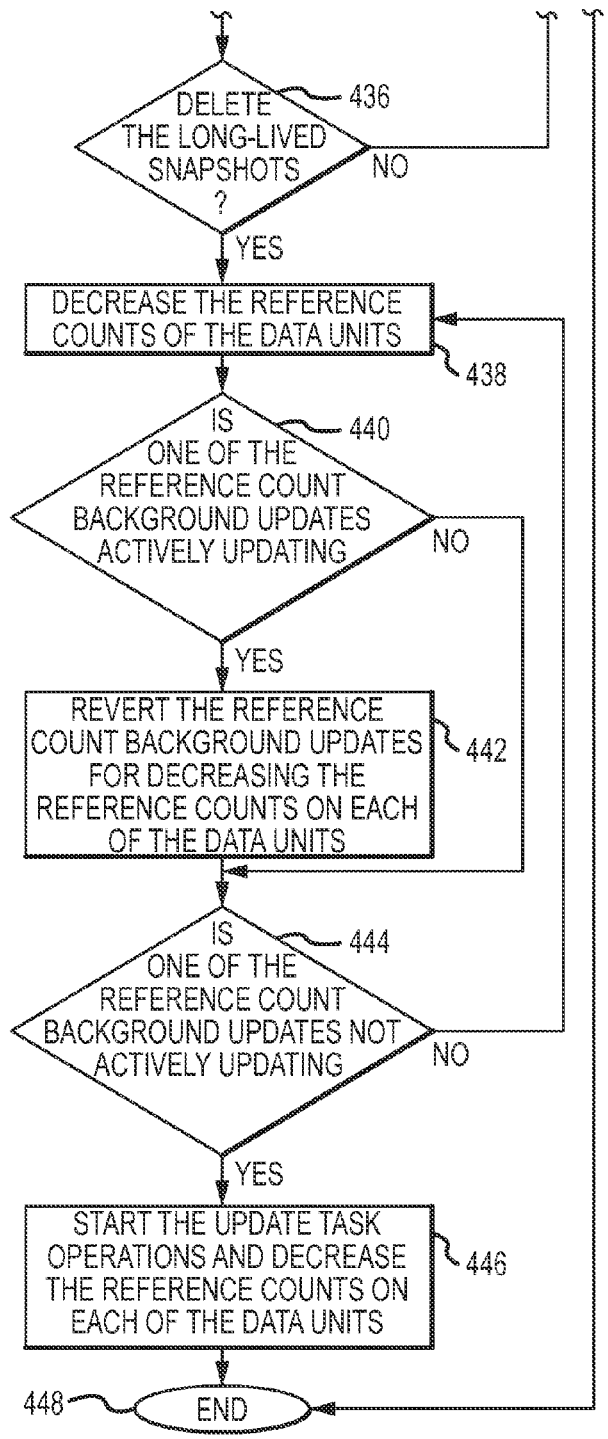

FIG. 4 is a flowchart illustrating an exemplary method 400 for a snapshot operation for faster snapshots. The method 400 begins with determining if the snapshots are short-lived snapshots (step 404). If no, the method 400 may determine if the snapshots are long-lived snapshots (step 426). If yes, the method 400 avoids the reference counts from being updated (step 406). The method 400 may at the time of creation of the short-lived snapshot start counting the number of short-lived snapshots and/or save the short-lived snapshots references (step 407). When a data unit is written to a volume (step 408), the method 400 may choose either one of two options; Option 1 is to use the count of short-lived snapshots on a master volume object (step 410) and Option 2 is to ignore the reference counts of the short-lived snapshots (step 412). A data unit having a zero reference count is prohibited from being released and is added to a data unit list. The method 400 may calculate the actual reference counts from the maintained count/list of short-lived snapshots and/or by going over a data model at the time of the write (step 414). Next, the method 400 may determine if the short-lived snapshots need to be deleted (step 416). If no, the method 400 may return to step 406 and repeat the preceding steps. If yes, the method 400 will determine first which of the previous two options (e.g., option 1 and/or option 2 described in steps 410 and 412) were used for the change in the data units being written. If the number of the short-lived snapshots were calculated (option 1) (step 418), the method 400 may decrease the reference counts only on the data units that were overwritten during the existence of the short-lived snapshots (step 420). If option 2 was applied and the reference counts of the short-lived snapshots were ignored (step 422), the method 400 checks only the data units that were changed during the existence of the short-lived snapshots and that are no longer shared between the short-lived snapshot and the volume against a data model for verifying that each of the data units are referenced by the short-lived snapshots (step 424). The short-lived snapshots not referenced are removed (step 425).

As mentioned above, if the snapshots are not short-lived snapshots, the method 400 may determine if the snapshots are long-lived snapshots (step 426). If yes, the method 400 may update the reference counts, in the background, for each of the data units between the creation and the deletion time (step 428). If no, the method 400 may end (step 448). For the long-lived snapshots, the method 400 will determine if there is a change in the data units being written (step 430). If no, the method 400 may return to step 428. If yes, the method 400 may calculate a number of the long-lived snapshots by checking for reference count background updates that are active (step 432) and update the reference counts of data units for those of the reference count background updates yet to be performed (step 434). Next, the method 400 may determine if the long-lived snapshots need to be deleted (step 436). If no, the method 400 may return to step 428 and repeat the preceding steps. If yes, the method 400 may decrease the reference counts of the data units (step 438). The method 400 may determine if any reference count background updates are actively updating (step 440). If yes, the method 400 may revert the reference count background updates for decreasing the reference counts on each of the data units (step 442). If no, the method 400 may determine if the reference count background updates of the long-lived snapshot are not actively updating (step 444). If the reference count background updates of the long-lived snapshot are not actively updating, the method 400 may start the reference count background updates and decrease the reference counts on each of the data units (step 446). If no, the method 400 may return to step 428 and repeat the preceding steps or may end (step 448).

As previously mentioned, the mechanisms of the illustrated embodiments avoid having the reference counts of the snapshot's data units from being updated at the time of snapshot creation/deletion. As an alternative to updating the reference counts of the data units at the time of the snapshot creation and/or deletion, the mechanisms may exhibit two different behaviors. First, at the time of the snapshot creation, for snapshots that are determined to be short-lived snapshots, the reference count will not be updated (a user may want to count the number of short-lived snapshots or save their references). For snapshots that are determined to be long-lived snapshots, reference count background updates, which update all data units' counts, may commence and perform such updates in the background. Subsequent to a data unit change, when a data unit is written to a volume, that has fast snapshots, the reference count of that original data unit is calculated on the fly and assigned to the original data unit. For the calculating, when the mechanisms write to a data block, a determination is made whether any snapshots reference the data block. With fast snapshots, the reference counts may not be up to date. Hence the mechanisms need to calculate the real reference count on the fly, in order to be able to say whether the block needs to be copied (reference count>1) or not.

In one embodiment, for short-lived snapshots, there are two optional behaviors for a change in the data units being written. First, option 1 will use the short-lived snapshots count by using the count of fast snapshots, which counting commenced at the time of the fast snapshot creation (this may be stored in a snapshot list), going over the list of short-lived snapshots, and/or by calculating (or by maintaining the number of short-lived snapshots) them from the data model at the time of the write. Second, option 2 will continue ignoring the reference count of short-lived snapshots. In the event a data unit has a zero reference count it may not be released, but rather added to a new list of data units to be checked. When the operation of checking for released data units is performed, the list of empty data units may be checked by referencing a data model (or data unit list) to verify that no short-lived snapshot reference the data unit before releasing it. Because the data unit is in the list, its reference count is/was zero at the time it entered the list. At this stage the data unit could either have become non-zero, because of a background reference count update, or it might still be zero—in which case the mechanisms should iterate over the fast snapshots of this volume to verify that it is actually not in use. For determining and/or calculating the long-lived snapshots count, the mechanisms may check the reference count background updates that are still active and updating the count of the data unit if a task has yet to perform the update.

For deleting short-lived snapshots, the mechanisms will determine if either option 1 and/or if option 2 (as previously described) was used. If option 1 was implemented for a data change then the mechanisms may decrease the reference count only on data units that where overwritten at the time of its existence. Due to the fact that the snapshot is a short-lived snapshot, the number of such data units should be small. If option 2 was implemented subsequent to a data change, then the mechanisms checks and compares only the data units that where changed during the existence of the short-lived snapshot, and that are no longer shared between the short-lived snapshot and the volume and are on the list of zero reference counts, against a data model to determine whether they are still referenced by a short-lived snapshot. If they are not referenced, they should be removed. This solution saves a significant part of the work performed on snapshot deletion in the reference count solution.

When deleting a long-lived snapshot, the mechanisms may decrease the reference count of all data-units. If the long-lived snapshots reference count background updates are still running, the reference count background updates may be reverted to decrease the reference counts on all the relevant data units. If the long-lived snapshots reference count background updates are no longer running, a reference count background updates may be started and decrease the reference count on all data units. For long-lived snapshots, the decreasing of reference count for all data units may also be performed at the deletion time, and by that, have the same performance cost as the original reference count solution.

Figure 5:
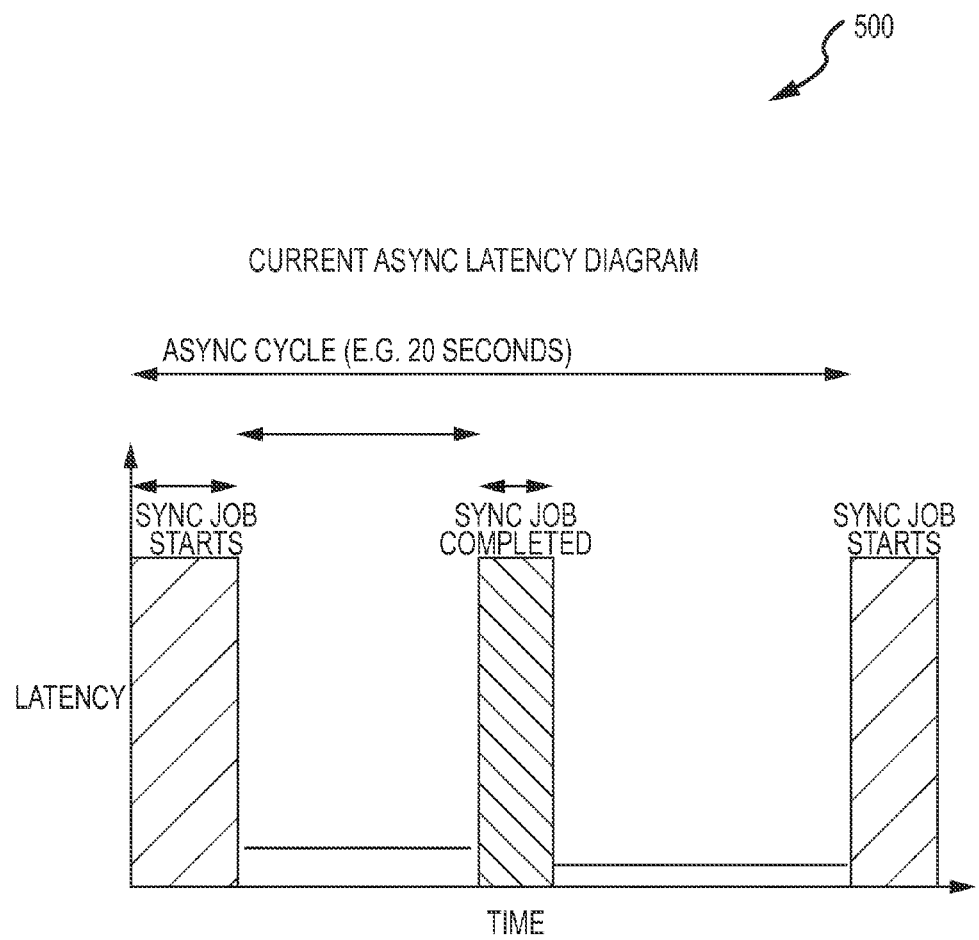
FIG. 5 illustrates an exemplary block diagram showing reduction in average latency of snapshot creation.

FIG. 5 illustrates an exemplary block diagram showing reduction in average latency of snapshot creation. The mechanisms of the illustrated embodiments, for creating faster snapshots, provide a way to reduce the average latency of snapshot creation. Specifically, the average latency of an asynchronous mirrored volume is reduced when the asynchronous solution is snapshot based, as previously described (e.g., as in IBM® XIV® storage systems). The mechanisms are based on the fact that when working with short intervals most of the data units will not change in the lifetime of the snapshot and the up-front cost of increasing and then decreasing the reference count of all data units will be spared. FIG. 5 depicts the latency represented on the vertical axis with time represented on the horizontal axis. The rectangular time columns of synchronous (or shown in the diagram as "sync") job starts, synchronous job completed, and synchronous job starts is due to snapshot creation and deletion. The reduction in the latency overhead, introduced by a snapshot based asynchronous solution, is significant when the requested RPO is low.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method of performing a snapshot for monitoring usage of one or more data units by a processor device in a computing environment, the method comprising:

labeling a snapshot as a long-lived snapshot or a short-lived snapshot utilized for asynchronous mirroring; wherein the long-lived snapshot comprises a snapshot having reference counts which are updated at a creation time and a deletion time, and the short-lived snapshot comprises a regular reference-counted snapshot except having the reference counts which are not updated at the creation time and the deletion time, and further wherein the short-lived snapshots are used for the asynchronous mirroring having a recovery point objective (RPO) below a certain threshold;

avoiding the reference counts of the one or more data units associated with each short-lived snapshot from being updated at the creation time and the deletion time of each respective short-lived snapshot;

reference counting changes to the one or more data units associated with each long-lived snapshot each time the one or more data units are updated;

determining that a snapshot should be deleted;

determining whether the snapshot is a short-lived snapshot or a long-lived snapshot;

deleting the snapshot; and when the snapshot is a short-lived snapshot, performing first reference count updates at a time other than the creation or the deletion time of each respective short-lived snapshot by performing:

decreasing the reference counts of the data units, when reference count background updates are actively updating, and reverting the reference count background updates for decreasing the reference counts on each of the data units.

2. The method of claim 1, further including, when the snapshot is determined to be short-lived, avoiding the reference counts from being updated.

3. The method of claim 2, further including, subsequent to a change in at least one of those of the data units being written, performing at least one of:

maintaining a number of short-lived snapshots in the computing environment, determining whether one of the data units is used by at least one of the short-lived snapshots, and ignoring the reference counts of the short-lived snapshots, wherein one of the data units having a zero reference count is added to a data unit list.

4. The method of claim 1, further including, when the snapshot is determined to be long-lived, updating the reference counts for each of the data units between the creation and the deletion time.

5. The method of claim 4, further including, subsequent to a change in each of those of the data units being written, performing at least one of:

calculating a number of long-lived snapshots by checking for reference count background updates that are active, wherein the reference counts are updated by the reference count background updates, and updating reference counts of data units for those of the reference count background updates yet to be performed.

6. The method of claim 1, further including, upon a deletion of a snapshot determined to be short-lived, performing at least one of:

when a number of short-lived snapshots is maintained:

decreasing the reference counts only on the data units that were overwritten during an existence of the short-lived snapshots, and when the reference counts of the short-lived snapshots are ignored:

checking each of the data units against a data model for verifying that each of the data units are referenced by the short-lived snapshots.

7. The method of claim 1, further including, upon a deletion of a snapshot determined to be long-lived, performing at least one of:

decreasing the reference counts of the data units, when reference count background updates are actively updating, reverting the reference count background updates for decreasing the reference counts on each of the data units, and when the reference count background updates are not actively updating, starting the reference count background updates and decreasing the reference counts on each of the data units.

8. A system for performing a snapshot for monitoring usage of one or more data units in a computing environment, comprising:

a processor device operable in the computing environment;

a snapshot module in communication with the processor device, the snapshot module adapted for labeling a snapshot as a long-lived snapshot or a short-lived snapshot utilized for asynchronous mirroring; wherein the long-lived snapshot comprises a snapshot having reference counts which are updated at a creation time and a deletion time, and the short-lived snapshot comprises a regular reference-counted snapshot except having the reference counts which are not updated at the creation time and the deletion time and further wherein the short-lived snapshots are used for the asynchronous mirroring having a recovery point objective (RPO) below a certain threshold; and a reference count module in communication with the snapshot module and the processor device, wherein the reference count module is adapted for avoiding the reference counts of the one or more data units associated with each short-lived snapshot from being updated at the creation time and flail the deletion time of each respective short-lived snapshot;

reference counting changes to the one or more data units associated with each long-lived snapshot each time the one or more data units are updated;

determining that a snapshot should be deleted;

determining whether the snapshot is a short-lived snapshot or a long-lived snapshot;

deleting the snapshot; and when the snapshot is a short-lived snapshot, performing first reference count updates at a time other than the creation or the deletion time of each respective short-lived snapshot by performing:

decreasing the reference counts of the data units, when reference count background updates are actively updating, and reverting the reference count background updates for decreasing the reference counts on each of the data units.

9. The system of claim 8, wherein the reference count module is further adapted for, when the snapshot is determined to be short-lived, avoiding the reference counts from being updated.

10. The system of claim 9, wherein the processor device is further adapted for, subsequent to a change in at least one of those of the data units being written, performing at least one of:

maintaining a number of short-lived snapshots in the computing environment, determining whether one of the data units is used by at least one of the short-lived snapshots, and ignoring the reference counts of the short-lived snapshots, wherein one of the data units having a zero reference count is added to a data unit list.

11. The system of claim 8, wherein the reference count module is further adapted for, when the snapshot is determined to be long-lived, updating the reference counts for each of the data units between the creation and the deletion time.

12. The system of claim 11, wherein the reference count module is further adapted for, subsequent to a change in each of those of the data units being written, performing at least one of:
- calculating a number of long-lived snapshots by checking for reference count background updates that are active, wherein the reference counts are updated by the reference count background updates, and
- updating reference counts of data units for those of the reference count background updates yet to be performed.

13. The system of claim 8, wherein the reference count module is further adapted for, upon a deletion of a snapshot determined to be short-lived, performing at least one of:
- when a number of short-lived snapshots is maintained:
  - decreasing the reference counts only on the data units that were overwritten during an existence of the short-lived snapshots, and
- when the reference counts of the short-lived snapshots are ignored:
  - checking each of the data units against a data model for verifying that each of the data units are referenced by the short-lived snapshots.

14. The system of claim 8, wherein the reference count module is further adapted for, upon a deletion of a snapshot determined to be long-lived, performing at least one of:
- decreasing the reference counts of the data units,
- when reference count background updates are actively updating, reverting the reference count background updates for decreasing the reference counts on each of the data units, and
- when the reference count background updates are not actively updating, starting the reference count background updates and decreasing the reference counts on each of the data units.

15. A computer program product for performing a snapshot for monitoring usage of one or more data units in a computing environment by a processor device, the computer program product comprising a non-transitory computer-readable storage medium having computer-readable program code portions stored therein, the computer-readable program code portions comprising:
- an executable portion for labeling a snapshot as a long-lived snapshot or a short-lived snapshot utilized for asynchronous mirroring; wherein the long-lived snapshot comprises a snapshot having reference counts which are updated at a creation time and a deletion time, and the short-lived snapshot comprises a regular reference-counted snapshot except having the reference counts which are not updated at the creation time and the deletion time and further wherein the short-lived snapshots are used for the asynchronous mirroring having a recovery point objective (RPO) below a certain threshold;
- an executable portion for avoiding the reference counts of the one or more data units associated with each short-lived snapshot from being updated at the creation time and the deletion time of each respective short-lived snapshot;
- an executable portion for reference counting changes to the one or more data units associated with each long-lived snapshot each time the one or more data units are updated;
- an executable portion for determining that a snapshot should be deleted;
- an executable portion for determining whether the snapshot is a short-lived snapshot or a long-lived snapshot;
- an executable portion for deleting the snapshot; and
- an executable portion for, when the snapshot is a short-lived snapshot, performing first reference count updates at a time other than the creation or the deletion time of each respective short-lived snapshot by performing:
  - decreasing the reference counts of the data units, when reference count background updates are actively updating, and
  - reverting the reference count background updates for decreasing the reference counts on each of the data units.

16. The computer program product of claim 15, further including an executable portion for, when the snapshot is determined to be short-lived, avoiding the reference counts from being updated.

17. The computer program product of claim 16, further including an executable portion for, subsequent to a change in at least one of those of the data units being written, performing at least one of:
- maintaining a number of short-lived snapshots in the computing environment,
- determining whether one of the data units is used by at least one of the short-lived snapshots, and
- ignoring the reference counts of the short-lived snapshots, wherein one of the data units having a zero reference count is added to a data unit list.

18. The computer program product of claim 15, further including an executable portion, when the snapshot is determined to be long-lived, updating the reference counts for each of the data units between the creation and the deletion time.

19. The computer program product of claim 18, further including an executable portion for, subsequent to a change in each of those of the data units being written, performing at least one of:
- calculating a number of long-lived snapshots by checking for reference count background updates that are active, wherein the reference counts are updated by the reference count background updates, and
- updating reference counts of data units for those of the reference count background updates yet to be performed.

20. The computer program product of claim 15, further including an executable portion for, upon a deletion of a snapshot determined to be short-lived, performing at least one of:
- when a number of short-lived snapshots is maintained:
  - decreasing the reference counts only on the data units that were overwritten during an existence of the short-lived snapshots, and
- when the reference counts of the short-lived snapshots are ignored:
  - checking each of the data units against a data model for verifying that each of the data units are referenced by the short-lived snapshots.

21. The computer program product of claim 15, further including an executable portion for, upon a deletion of a snapshot determined to be long-lived, performing at least one of:
- decreasing the reference counts of the data units,
- when reference count background updates are actively updating, reverting the reference count background updates for decreasing the reference counts on each of the data units, and when the reference count background updates are not actively updating, starting the reference count background updates and decreasing the reference counts on each of the data units.

* * * * *